Dec. 16, 1969  D. A. HILLMAN  3,484,427

DILUENT PURIFICATION PROCESS AND APPARATUS

Filed Dec. 30, 1964

INVENTOR
D. A. HILLMAN

BY

*Young Young*

ATTORNEYS 3,484,427
DILUENT PURIFICATION PROCESS
AND APPARATUS
Donald A. Hillman, Bartlesville, Okla., assignor to
Phillips Petroleum Company, a corporation of
Delaware
Filed Dec. 30, 1964, Ser. No. 422,259
Int. Cl. C08c 3/06; C08f 3/18
U.S. Cl. 260—94.7                           5 Claims

ABSTRACT OF THE DISCLOSURE

An impure diluent from a reaction zone is purified by introducing the diluent to an isomerization unit having a metal halide catalyst, and subsequently fractionating the diluent.

---

Figure 1:
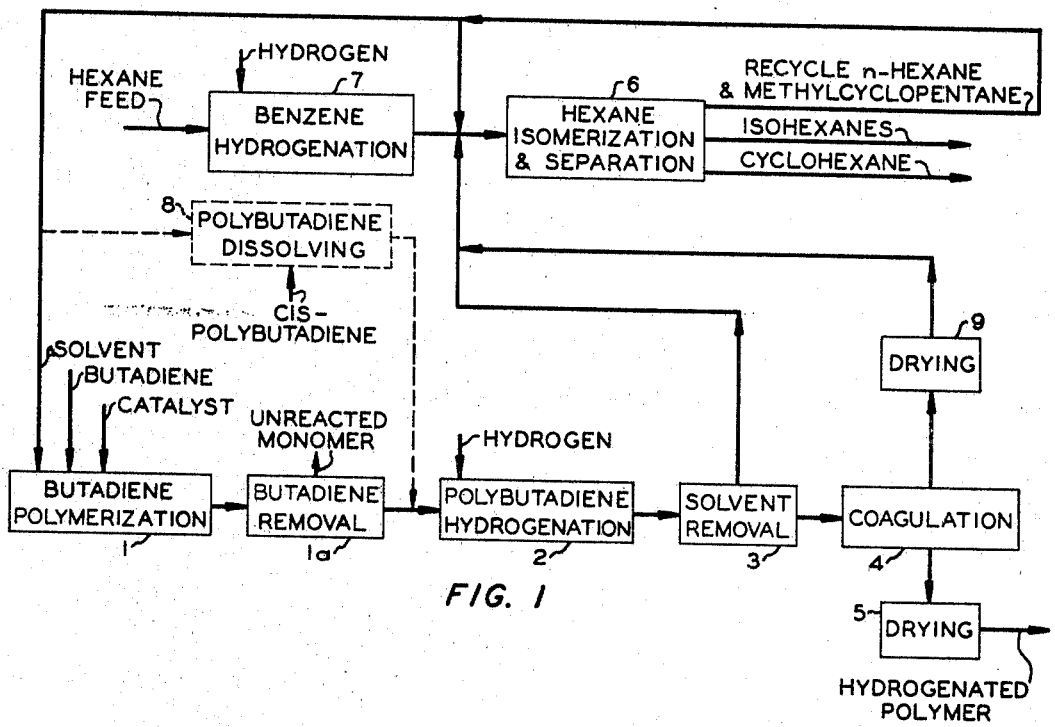

This invention relates to the purification of a diluent.

In one of its aspects, this invention relates to the purification of a diluent in an isomerization unit. In another of its aspects, this ivention relates to the production of a diluent from an isomerization unit to which the diluent removed from another reaction process has been added. In still another aspect, this invention relates to the recycle of a diluent from a reaction process, e.g., a polymer hydrogenation process, to a previous reaction process, e.g., butadiene polymerization following purification in an isomerization unit. In another of its aspects, this invention relates to the combination of isomerization and other reaction processes, e.g., polymerization and hydrogenation.

In various processes and reactions where solvents or diluents are used, and particularly in processes where catalysts are used, several problems in the retreatment of the solvent or diluent exist. It is customary to recycle the diluents time and time again through the chemical process and then through separations steps such as fractionation, steam-stripping, and adsorption for repurification purposes. These methods of diluent retreatment in practice are only partially successful since it has been found difficult to keep the catalyst poisons at minimum concentrations. It has also been found, in some instances, that color-forming materials can be introduced into the chemical process via the diluent which can produce an undesirably colored product particularly from a polymerization or polymer hydrogenation reaction.

I have now found that the diluent from a reaction zone can be purified by adding it to the feed to a process for the isomerization of such a diluent, and recovering from the isomerization unit effluent, unconverted diluent which is recycled as a feed to the reaction zone.

An object of this invention is to provide an effective method for treating diluent and/or solvent. Another object of this invention is to provide a method for recycling diluents. Further, an object of this invention is to provide an economic method for treating diluents by utilizing other operating units. Another object of this invention is to economically combine processes which use similar materials as feeds thereto particularly where a diluent in a reaction process is also usable as a reactant to an isomerization process.

Other aspects, objects, and the several advantages of this invention will become apparent from a study of this disclosure, the drawing and the appended claims.

In accordance with the practice of this invention, diluent is separated from a reaction zone and is purified by adding it to the feed to an isomerization unit and processing it through the unit. The purified diluent product of the isomerization unit can then be recycled and introduced to the reaction zone from which the diluent was separated, or to another reaction zone.

In accordance with a first embodiment of this invention, the solvent for the polymer in the polybutadiene hydrogenation process is removed from the polymer following the hydrogenation step and is added to the feed stream for an isomerization unit. The isomerization unit satisfactorily purifies the solvent by contact with isomerization catalyst and by exhaustive fractional distillation so that it can be reused as solvent in the polymerization of butadiene which is subsequently hydrogenated. Further in accordance with this invention, the solvent can be utilized to dissolve previously produced polybutadiene so as to produce a feed solution for the process for the hydrogenation of the polyer. This solvent can then be removed and added to the feed stream to a hydrocarbon isomerization unit wherein it is sufficiently purified to be used as polymerization diluent and/or reused as solvent in the polymer hydrogenation process.

Following the removal of the major portion of the solvent from the hydrogenated polymer, the polymer is recovered by adding a coagulant to a mixture of the hydrogenated polymer and the remaining solvent. The recovered hydrogenated polymer is then dried in pellet form to produce a final product which can be bagged.

In accordance with the process of this invention, hydrogenation of polybutadiene can be carried out by charging a butadiene polymer, substantially free of unreacted monomer(s) and salts or other materials which might act as hydrogenation catalyst poisons, to a suitable hydrogenation reactor wherein the polymer is in the form of a solution or a dispersion in a suitable vehicle. In some instances, depending upon the solvent or diluent employed, the polymer is dissolved completely, while in other instances a dispersion is formed. A catalyst can be employed in the hydrogenation reactor which can either be a fixed bed catalyst or a fluidized catalyst. In some instances, a soluble catalyst can also be used.

In the operation of the polybutadiene hydrogenation reactor, if the polymer has been previously dissolved in the polymerization solvent, only the hydrogenation catalyst is added after unreacted butadiene has been removed. Hydrogen is then added and the temperature raised to a suitable level to initiate the reaction. This operation can be carried out in a batch or a continuous process. When sufficient hydrogenation has been effected, usually as indicated by a decrease in polymer unsaturation, a drop in both reactor hydrogen pressure and/or the achievement of a desired temperature rise in a continuous reactor, the reaction is stopped by removing hydrogen, cooling or the like and the dispersion or solution of polymer and catalyst in vehicle is treated by suitable means such as by filtering, centrifuging and the like to remove the catalyst. Magnetizable catalysts such as activated nickel can be removed very advantageously by passing the solution or dispersion after hydrogenation through a packing which has been energized with a high field flux by either permanent or electro-magnets. Suitable devices are a tube packed with fine steel wool, fine magnetic rings, fine magnetic screens, etc., on the outside of which are the magnets. Demagnetizing the packing permits removal of the catalyst particles from the packing. A particular form of magnetic separator which has been found to be useful is disclosed in U.S. Patent No. 2,786,047. The hydrogenated polymer is then separated from the solvent or dispersing medium, by means well known in the art such as disclosed in U.S. Patent No. 3,003,515.

The catalyst employed in the polybutadiene hydrogenation step is preferably a nickel-kieselguhr catalyst of a particular particle size which has been activated under particular conditions. The catalysts which are suitable for use include nickel-kieselguhr, Raney nickel, copper chromate, molybdenum sulfide, finely divided platinum, finely divided palladium, platinum oxide, copper chromium oxide, and the like. Rufert nickel has also been used. The preferred particle size of the nickel-kieselguhr catalyst is between 1 to 8 microns, the particles having been activated at a temperature of 500 to 800° F. for a period of several hours by passing hydrogen thereover. The preferred treating conditions have been at a temperature of about 675° F. for a period of about 4 hours using approximately 100 volumes of hydrogen per volume of catalyst. Such a treatment reduces at least a part of the nickel compound to elemental nickel, generally 35–40 percent of the nickel being reduced. The hydrogenation of the polymer of about 2 to 30 weight percent on the unreduced basis catalyst based upon the weight of the polymer is a desirable rate of hydrogenation. The catalyst thus prepared can be used as either a fixed bed catalyst or as a fluidized bed catalyst in accordance with methods which are well known to those skilled in the art.

In accordance with a second embodiment of this invention, solution polymerization of well-known monomers is accomplished employing as a solvent mixture a hydrocarbon stream which is both an acceptable feed stream to and an effluent product from an isomerization-separation process, the polymer so produced being separated from the solvent which is fed to the isomerization process for repurification. As examples of polymers now desired, a wide variety of rubber-like materials can be produced by homopolymerization of butadiene or by copolymerization of butadiene and styrene in a predominantly normal hexane solvent by lithium catalysts such as butyllithium. Depending upon reaction conditions, charge order of monomers, presence of a randomizing agent, etc., so-called block, random, and random-block copolymers can be produced for uses where the special physical properties of the polymers are of value. An example of such processes is given in U.S. Patent No. 2,975,160 to R. P. Zelinski.

Referring now to the drawing, in FIGURE 1, 1 is a polybutadiene reaction process to which butadiene, a catalyst and normal hexane solvent are charged. Following conventional removal of unreacted butadiene in 1a, the polymer solution is then passed to polybutadiene hydrogenation process 2, to which a hydrogenation catalyst and hydrogen from suitable sources are added. Following sufficient hydrogenation, the catalyst is removed from the hydrogenated polybutadiene solution and this solution is passed to solvent removal zone 3, wherein the major portion of the solvent is separated from the polymer, which, with the remaining solvent, is passed to coagulation zone 4 wherein the final removal of solvent from hydrogenated polybutadiene is performed, and the polymer is passed to drier 5. The solvent removed in solvent removal zone 3 can be added to the feed to hexane isomerization process 6, or alternatively, it can be added to the hexane feed passing into benzene hydrogenation process 7. Normal hexane not converted to isohexanes by the hexane isomerization process 6 is separated therein by superfractionation and a portion of this highly purified stream can then be recycled to polybutadiene reaction process 1 as solvent feed thereto.

Alternatively, the polybutadiene hydrogenation process feed can be a previously produced polybutadiene such as cis-1,4-polybutadiene. Baled cis-1,4-polybutadiene can be introduced to chopping and shredding steps and then to a dissolving zone 8 wherein it is dissolved in a suitable solvent, such as $nC_6$ and/or methylcyclopentane, from the hexane isomerization process 6. As is known, cis-1,4-polybutadiene can be produced by solvent polymerization of butadiene initiated by a titanium chloride-alkylaluminum catalyst system. The polymer solution is then fed to polybutadiene hydrogenation process 2. The solution of hydrogenated polybutadiene produced in polybutadiene hydrogenation process 2 is then transferred to solvent removal zone 3 in which most of the solvent is removed following which this solvent is introduced into either the hexane isomerization process 6 or the benzene hydrogenation process 7. The concentrated hydrogenated polybutadiene solution is passed to coagulation zone 4 and drier 5 in a similar manner to the polybutadiene produced in reactor 1.

If desired, coagulation of the polymer in zone 4 can be accomplished by steam stripping for removal of the remaining solvent, producing a slurry of polymer in water. In drying zone 5, the bulk of the water can be separated from the polymer by passage over shaker screens, and the wet polymer can be squeezed for water extraction and can be final dried by extrusion or hot air drying. These processes are well known in the art such as shown by U.S. Patent No. 3,119,146. The steam stripped solvent can be condensed, decanted from the water phase and dried in zone 9 by fractionation such as disclosed in U.S. Patent No. 2,994,644, after which it can be introduced to hexane isomerization process 6 or benzene hydrogenation process 7 along with the flash-vaporized solvent from zone 3.

Figure 2:
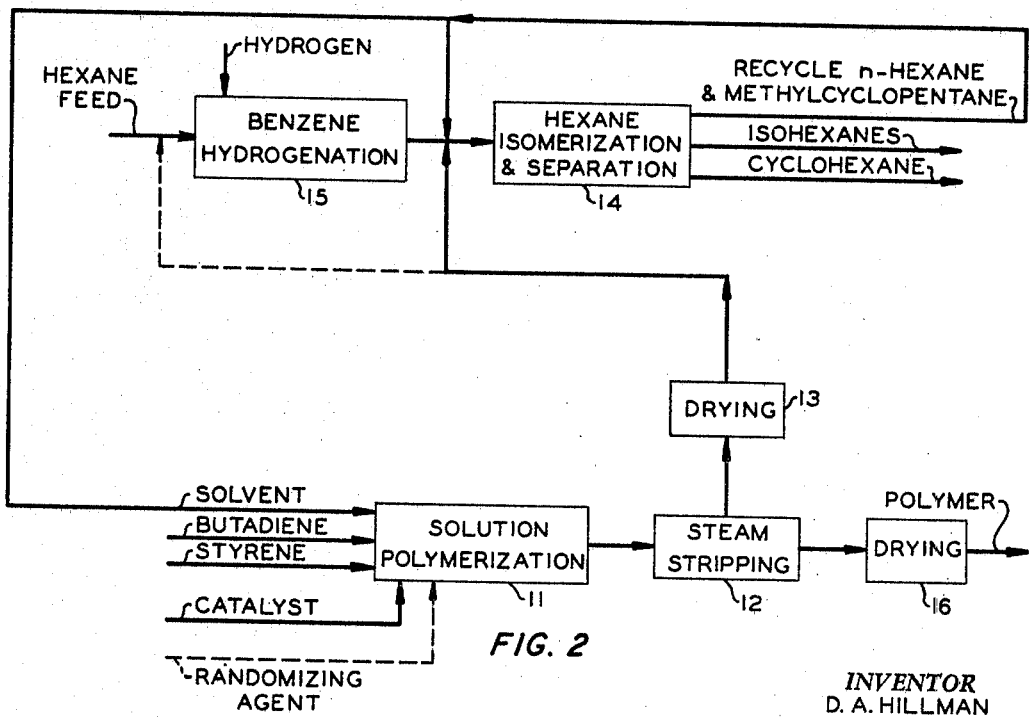

FIGURE 2 is a second embodiment of the invention in which 11 is a solution polymerization process to which butadiene and styrene, which are to be copolymerized, a catalyst and normal hexane solvent are added. If desired, a randomizing agent such as an ether can also be added. Following polymerization, the solution is introduced to steam stripping zone 12 wherein the solvent is removed from the polymer. The solvent thus removed is dried in drying zone 13 and added to the feed of hexane isomerization unit 14. Alternatively, the separated solvent can be added to the hexane feed passing into benzene hydrogenation process 15. Normal hexane not converted to isohexanes by the hexane isomerization process 14 is separated therein by superfractionation and a portion of this highly purified stream can then be recycled to solution-polymerization process 11 as solvent feed thereto. The copolymer from steam stripping zone 12 is passed to drying zone 16 wherein the polymer is dried.

The solvent used in the hydrogenation process is preferably nonreactive in the hydrogenation process but this is not an absolute requirement since small concentrations of unsaturated materials can be tolerated in an otherwise saturated solvent. When solvents containing four percent or less aromatics are used, the aromatics are usually hydrogenated concomitantly with the polymer.

The preferred solvent for use in this process is normal hexane, however, other pure or mixed solvents can be used if they are produced as a relatively poison-free stream by hexane isomerization process 6 or 14. Suitable solvents include saturated cyclic hydrocarbons such as cyclohexane, methylcyclopentane, methylcyclohexane, Decalin, and the like. Other paraffinic hydrocarbons such as octanes, heptanes and isohexanes and the like can also be used.

Polymerization of the butadiene can be carried out in a conventional manner in which the butadiene is reacted by means of a butyllithium catalyst in the presence of a solvent. The solvent-diluent used in the polymerization reaction can be and preferably is the same as the solvent used in the hydrogenation reaction. Alternatively, the polymer used to produce the hydrogenated polymer material can be selected from other homopolymers of butadiene catalyzed by other initiators, and copolymers of butadiene and styrene, using not over 30 parts by weight of styrene per 100 parts by weight of total monomers. These latter polymers can be prepared by solution polymerization, the temperature of the polymerization ranging from −5° F. to 140° F., preferably from 20 to 60° F. Polymers of butadiene produced at 41° F. have produced hydrogenated materials of the best balance of properties. Using the emulsion polymerization, it has been found that approximately 75 to 85 percent of the butadiene polymer is formed as a result of 1,4-addition, as compared with 15 to 25 percent of the polymer being formed as a result of 1,2-addition.

Polymerization processes which can be used in the practice of this invention are set forth in U.S. Patent 3,030,432, to Warner and U.S. Patent 2,975,160 to Zelinski.

Another source of polymer is baled, dried, previously-produced polybutadiene which can be chopped and shedded and then hydrogenated in the presence of methylcyclopentane or other solvent. In this case, a methylcyclopentane-containing stream from a hexane isomerization process can be used in the polybutadiene hydrogenation step as solvent for the chopped and shredded polybutadiene. Following the polybutadiene hydrogenation, methylcyclopentane is removed by the step of solvent removal and added to the hexane isomerization feed. However, if necessary, this methylcyclopentane can also be added to the hexane feed prior to the benzene hydrogenation step as hereinbefore described.

Hydrogen for the benzene hydrogenation process and for the polybutadiene hydrogenation process can be supplied from any suitable hydrogen source, such as a catalytic reforming process.

The isomerization process will be described with reference to the isomerization of a preferred solvent, hexane. In the hexane isomerizaiton process, removal of contaminants from the hexane feed, namely benzene and sulfur, is effected by contacting the feed with a hydrogen-reduced nickel catalyst and hydrogen under suitable conditions of elevated temperature and pressure. As the result of this operation, benzene contained in naturally occurring $C_6$ hydrocarbon fractions is hydrogenated and converted to cyclohexane. The sulfur in the feed material reacts with the nickel catalyst converting the catalyst to nickel sulfide. The latter reaction inactivates the catalyst, therefore periodically it is necessary to withdraw and dump the spent catalyst and to add fresh catalyst to the system. Isomerization of the normally acyclic and alkyl-substituted alicyclic hydrocarbons is carried out at a temperature usually in the range of about 90° F. to 160° F., the particular temperature employed being dependent upon the composition of the material to be converted. Various normal acyclic compounds can be isomerized to the corresponding iso compounds including n-butane, n-pentane, n-hexane, n-heptane, etc. Of these, the preferred for use in this invention as has hereinbefore been described is n-hexane. Likewise, methylcyclopentane contained in the $C_6$ fraction is isomerized to cyclohexane. Other product streams resulting from the hexane isomerization process can include, but are not limited to, cyclohexane, motor fuel, recycle normal hexane and methylcyclopentane, and others.

In the isomerization process, the reaction is preferably carried out under sufficient pressure to provide a liquid phase reaction, namely a pressure in the range of about 150 to about 300 p.s.i.g. The contact or residence time of the reactants in the reactor varies usually between about 0.1 and about 5 hours.

The catalyst employed in carrying out the isomerization comprises metal halides such as aluminum chloride, aluminum bromide, boron trifluoride, and halides of such metals as zinc, tin, arsenic, antimony, zirconium, beryllium, titanium, iron, and the like. These catalysts are especially effective when present as complexes which are formed by interaction between the metal halides and the hydrocarbons present in the reaction system. A particularly desirable isomerization catalyst is the complex of hydrocarbon with aluminum chloride. In addition to the catalyst, it is desirable that the corresponding hydrogen halide, in this case hydrogen chloride, be present in the reaction zone since the material maintains catalytic activity at a high level. Such a process is described in U.S. Patent 2,953,606 to Dean et al.

As hereinbefore described, the removal of contaminants, namely benzene and sulfur, from the isomerization feed is effected by hydrogenation. This can be done at suitable conditions at elevated temperatures, usually between about 360 and 500° F. and at about 400 p.s.i.g. Usually the liquid-hourly-space-velocity for the reaction is between about 1 and about 3 cubic feet of liquid per cubic foot of catalyst per hour. Operation with an excess of hydrogen is preferred, therefore it is desirable that more than the three mols necessary to convert each mol of benzene be present in the reaction zone. Preferably, the hydrogen concentration is such as to provide a hydrogen/benzene ratio of between about 4 and about 16 mols per mol.

Since the solvent separated from the hydrogenated polybutadiene solution is substantially free from benzene and sulfur compounds, its having previously been produced in the hexane isomerization unit, it ordinarily does not need to pass through the benzene hydrogenation unit. However, as an alternative, it can be added to the hexane feed thereto and both the solvent and the hexane feed can be passed through the benzene hydrogenation unit to remove impurities as well as to hydrogenate benzene therein to cyclohexane.

Although the invention has been found to be useful in relation to the polymerization of butadiene and the hydrogenation of polybutadiene as hereinbefore described, these processes have only been used by way of example and not as limitation. The invention is equally applicable to the production of polyolefins generally and to other processes which utilize diluents which require purification prior to reuse.

EXAMPLE

The following example is provided to illustrate the application of the invention of FIGURE 2 on a commercial scale.

Polymerization diluent is taken from hexane isomerization unit 14 which has the following approximate composition.

| Component: | Liquid volume percent |
|---|---|
| n-Hexane | 71.3 |
| Methylcyclopentane | 15.0 |
| Isohexanes | 7.8 |
| Cyclohexane | 5.7 |
| Isoheptanes | 0.2 |

A total of 55,200 gallons per day of diluent is used and is charged in 24 separate batches to the polymerization system 11. Each batch comprises 206 gallons of 1,3-butadiene, 47 gallons of styrene, 2300 gallons of diluent, and 0.26 part by weight n-butyllithium per 100 parts by weight of monomers. The polymerization reactor temperature is about 50° C. and the pressure is autogeneous. Upon completion of the polymerization, the reactor effluent is passed to steam stripping zone 12 wherein the diluent is separated from the polymer. The vaporized diluent plus steam is condensed, and the hydrocarbon is then decanted and dried by fractionation in drying zone 13. The dry diluent stream is returned to the hexane isomerization process 14, or if minor concentrations of unreacted monomers are present, it can be returned to benzene hydrogenation process 15. About 1430 pounds of dried polymer product is produced in and recovered from each reactor batch.

Reasonable variation and modification are possible within the scope of the foregoing disclosure, the drawing and the appended claims to the invention, the essence of which is that there have been provided method and apparatus for the purification of a diluent wherein the diluent is separated from a reaction zone and introduced to an isomerization unit either into the feed stream before isomerization of the feed or into the unit itself wherein the solvent is purified and recycled to the reaction zone or another reaction process.

I claim:
1. A combined method comprising
   (a) polymerizing butadiene with an organolithium catalyst in the presence of a hexane diluent;
   (b) hydrogenating the polymerized butadiene in the presence of said hexane diluent;
   (c) separating said hexane diluent from the hydrogenated polybutadiene;

(d) introducing said hexane diluent to the feed stream of a hexane isomerization unit having an aluminum chloride catalyst and subjecting same to isomerization conditions;

(e) fractionating the effluent from said isomerization unit to yield a purified stream of hexane; and (f) recycling said purified stream of hexane produced by the isomerization unit and recovered in step (e) to said butadiene polymerization reaction.

2. A combined method comprising (a) polymerizing butadiene in the presence of a diluent selected from paraffinic hydrocarbons and saturated cyclic hydrocarbons selected from normal hexane, isohexane, heptane, octane, cyclohexane, methylcyclopentane, methylcyclohexane, and decalin, and an organolithium catalyst;

(b) separating the diluent from the polymerization reaction;

(c) introducing the diluent to an isomerization unit having a metal halide catalyst selected from aluminum chloride, aluminum bromide, boron trifluoride and the halides of zinc, tin, arsenic, antimony, zirconium, beryllium, titanium and iron, and subjecting same to isomerization conditions;

(d) fractionating the effluent from said isomerization unit to yield a purified stream of diluent; and (e) recycling said purified stream of diluent produced by the isomerization unit and recovered in step (d) to the polymerization reaction.

3. A combined method comprising (a) polymerizing butadiene in the presence of a hexane diluent and an organolithium catalyst;

(b) hydrogenating the polymerized butadiene in the presence of said hexane polymerization diluent;

(c) separating said hexane diluent from the hydrogenated polybutadiene;

(d) introducing said hexane diluent separated in step (c) to a hexane feed stream containing benzene and hydrogenating said feed stream;

(e) introducing the hydrogenated feed stream to an isomerization unit having a catalyst selected from aluminum chloride, aluminum bromide, boron trifluoride, and the halides of zinc, tin, arsenic, antimony, zirconium, beryllium, titanium and iron, and subjecting same to isomerization conditions;

(f) fractionating the effluent from said isomerization unit to yield a purified stream of hexane;

(g) recycling said purified stream of hexane produced in the isomerization unit and recovered in step (f) to the polymerization reaction; and (h) coagulating and drying the hydrogenated polybutadiene.

4. A combined method comprising (a) chopping and shredding baled polybutadiene polymer;

(b) introducing solvent comprising methylcyclopentane and hexane to the chopped and shredded polybutadiene polymer and producing a polybutadiene solution therefrom;

(c) introducing the polymer solution to a polybutadiene hydrogenation unit;

(d) hydrogenating the polybutadiene;

(e) separating said solvent comprising methylcyclopentane and hexane from the hydrogenated polybutadiene;

(f) purifying the solvent by processing it through an isomerization unit having a catalyst selected from aluminum chloride, aluminum bromide, boron trifluoride, and the halides of zinc, tin, arsenic, antimony, zirconium, beryllium, titanium and iron, and subjecting same to isomerization conditions;

(g) fractionating the effluent from said isomerization unit to yield a purified stream of methylcyclopentane and hexane;

(h) recycling the purified solvent stream to the polybutadiene hydrogenation unit; and (i) coagulating and drying the hydrogenated polybutadiene.

5. The process of claim 4 wherein said organolithium catalyst is n-butyllithium, said polymerizing is conducted with a mixture of butadiene and styrene as the monomers to produce a butadiene-styrene copolymer.

References Cited

UNITED STATES PATENTS

| | | | |
|---|---|---|---|
| 2,046,257 | 6/1936 | Flint | 260—94.7 XR |
| 3,116,242 | 12/1963 | Mertz | 260—94.9 XR |
| 2,786,047 | 3/1957 | Jones et al. | |
| 2,953,606 | 9/1960 | Dean et al. | |
| 2,975,160 | 3/1961 | Zelinski. | |
| 2,994,644 | 8/1961 | Clayu. | |
| 2,999,890 | 9/1961 | Davidson | 260—666 |
| 3,030,432 | 4/1962 | Warner. | |
| 3,119,146 | 1/1964 | Crandall. | |

JOSEPH L. SCHOFER, Primary Examiner

WILLIAM F. HAMROCK, Assistant Examiner

U.S. Cl. X.R.

260—85.1, 96, 683.74